(12) United States Patent
Arbitmann et al.

(10) Patent No.: US 9,744,862 B2
(45) Date of Patent: Aug. 29, 2017

(54) SLIP-CONTROLLED BRAKING SYSTEM FOR ELECTRICALLY DRIVEN MOTOR VEHICLES

(71) Applicant: Continental Teves AG & Co. oHG, Frankfurt (DE)

(72) Inventors: Maxim Arbitmann, Frankfurt am Main (DE); Zhenfu Chen, Schwalbach (DE); Thomas Raste, Oberursel (DE); Peter Lauer, Karben (DE); Matthias Muntu, Hofheim (DE); Daniel Schmitz, Hennef (DE)

(73) Assignee: Continental Teves AG & Co. oHG (DE)

( * ) Notice: Subject to any disclaimer, the term of this patent is extended or adjusted under 35 U.S.C. 154(b) by 36 days.

(21) Appl. No.: 14/346,983

(22) PCT Filed: Sep. 27, 2012

(86) PCT No.: PCT/EP2012/069137
§ 371 (c)(1),
(2) Date: Mar. 25, 2014

(87) PCT Pub. No.: WO2013/045584
PCT Pub. Date: Apr. 4, 2013

(65) Prior Publication Data
US 2014/0257664 A1  Sep. 11, 2014

(30) Foreign Application Priority Data
Sep. 28, 2011 (DE) .......................... 10 2011 083 650

(51) Int. Cl.
*B60L 7/26* (2006.01)
*B60T 8/1755* (2006.01)
(Continued)

(52) U.S. Cl.
CPC ................... *B60L 7/26* (2013.01); *B60L 7/18* (2013.01); *B60T 1/10* (2013.01); *B60T 7/107* (2013.01);
(Continued)

(58) Field of Classification Search
None
See application file for complete search history.

(56) References Cited

U.S. PATENT DOCUMENTS 5,667,286 A * 9/1997 Hoying ................. B60T 8/1755
303/140
6,709,075 B1 * 3/2004 Crombez ............... B60L 3/102
303/152

(Continued)

FOREIGN PATENT DOCUMENTS

AT            12 010 U2    9/2011
DE       197 03 061 A1    7/1997
(Continued)

OTHER PUBLICATIONS

International Search Report for PCT/EP2012/069137 mailed Jan. 15, 2013.
German Search Report for 10 2012 217 679.9 dated Apr. 19, 2013.

*Primary Examiner* — Todd Melton
*Assistant Examiner* — Jason Roberson
(74) *Attorney, Agent, or Firm* — RatnerPrestia

(57) ABSTRACT

A braking system for a motor vehicle, including friction brakes on the wheels of at least one axle, the brakes controlled by a friction brake control device; at least one electric machine connected to at least one wheel and controlled by an electric drive control device; a brake pedal for detecting a deceleration request; a wheel-slip controlling device; and a torque distributing device. The devices for detecting a deceleration request are connected to the wheel-slip controlling device, the wheel-slip controlling device specifying target braking torques for each wheel according (Continued)

to the parameters of the deceleration request. The wheel-slip controlling device connected to a torque distributing device which is connected to the friction brake control device and the electric drive control device and which specifies friction brake requests to the friction brake control device and generator brake requests to the electric drive control device according to the target braking torques.

10 Claims, 2 Drawing Sheets

(51) Int. Cl.
    *B60T 8/1761*     (2006.01)
    *B60L 7/18*     (2006.01)
    *B60T 1/10*     (2006.01)
    *B60T 8/1766*     (2006.01)
    *B60T 7/10*     (2006.01)
    *B60T 7/22*     (2006.01)
    *B60T 13/74*     (2006.01)

(52) U.S. Cl.
    CPC .............. *B60T 7/22* (2013.01); *B60T 8/1755* (2013.01); *B60T 8/1761* (2013.01); *B60T 8/1766* (2013.01); *B60T 8/17551* (2013.01); *B60T 13/746* (2013.01); *B60T 2270/602* (2013.01); *B60T 2270/604* (2013.01); *B60T 2270/613* (2013.01)

(56) References Cited

U.S. PATENT DOCUMENTS

| | | | | |
|---|---|---|---|---|
| 2006/0273657 | A1* | 12/2006 | Wanke | B60T 8/17555 303/146 |
| 2008/0210497 | A1* | 9/2008 | Jeon | B60L 7/26 188/72.1 |
| 2009/0236905 | A1* | 9/2009 | Maeda | B60T 8/1755 303/146 |
| 2010/0094511 | A1 | 4/2010 | Krueger et al. | |

FOREIGN PATENT DOCUMENTS

| | | |
|---|---|---|
| DE | 10 2008 017 478 A1 | 10/2008 |
| DE | 10 2007 056 359 A1 | 5/2009 |
| DE | 10 2008 001 455 A1 | 11/2009 |
| DE | 10 2009 030 816 A1 | 11/2010 |
| DE | 10 2011 003 346 A1 | 9/2011 |
| EP | 0 792 228 B1 | 9/1997 |
| WO | WO 2009/077835 A1 | 6/2009 |
| WO | WO 2011/015442 A1 | 2/2011 |

* cited by examiner

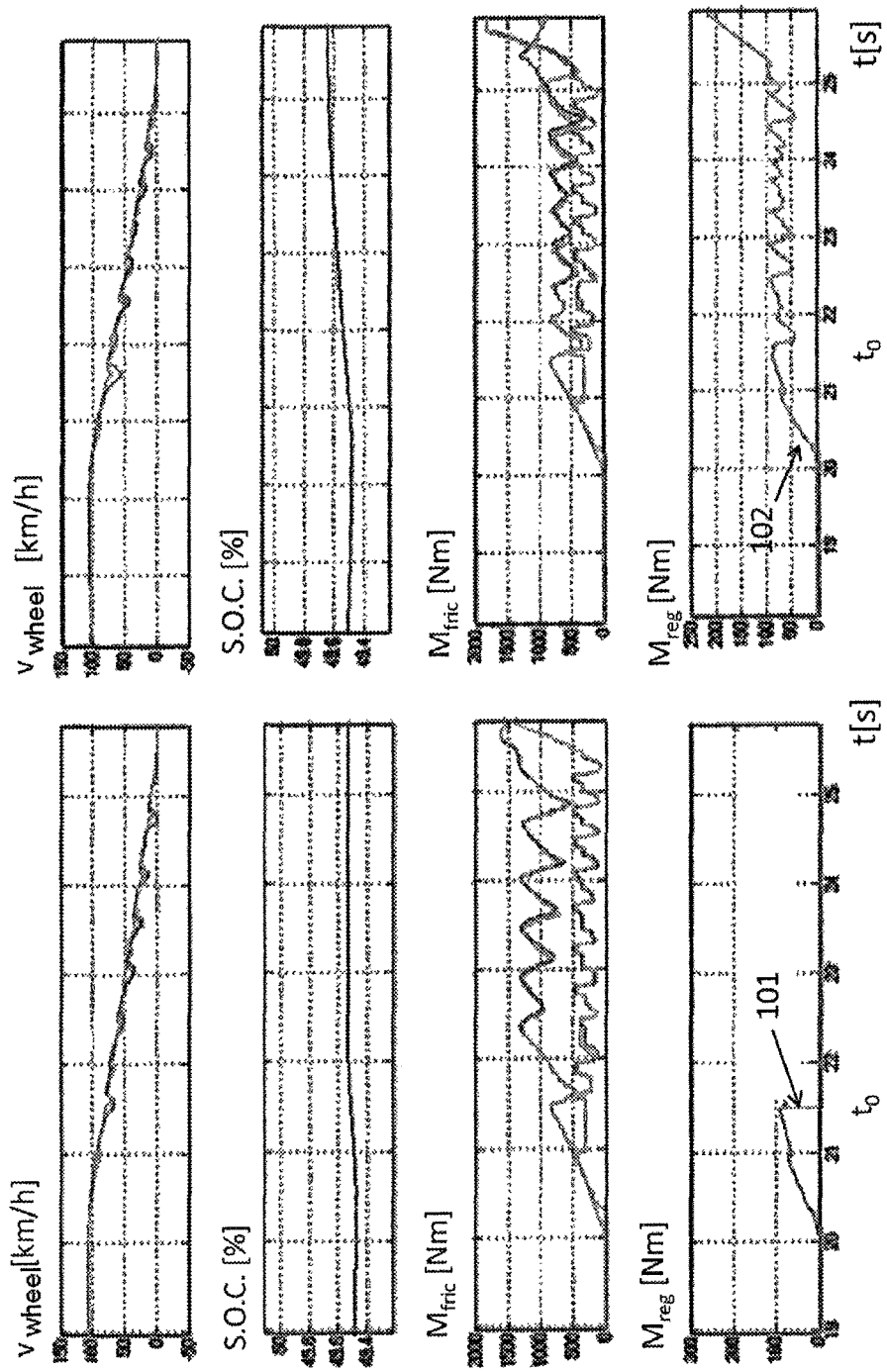

SLIP-CONTROLLED BRAKING SYSTEM FOR ELECTRICALLY DRIVEN MOTOR VEHICLES

CROSS REFERENCE TO RELATED APPLICATIONS

This application is the U.S. National Phase Application of PCT/EP2012/069137, filed Sep. 27, 2012, which claims priority to German Patent Application No. 10 2011 083 650.0, filed Sep. 28, 2011, the contents of such applications being incorporated by reference herein.

FIELD OF THE INVENTION

The invention relates to a brake system for a motor vehicle comprising friction brakes on the wheels of at least one axle, which friction brakes are actuated by a friction brake control device, at least one electric machine which is connected to at least one wheel and is actuated at least at times as a generator by an electric drive control device, means for detecting a deceleration request, in particular a sensor for detecting activation of a brake pedal, and a wheel slip control device and to a method for making available slip-controlled braking processes in vehicles having at least partially an electric drive.

BACKGROUND OF THE INVENTION

Entirely or partially electrically driven motor vehicles or electric vehicles or hybrid vehicles which combine electric vehicle drives and internal combustion engines have reduced emissions compared to conventional motor vehicles with an internal combustion engine. In this context one or more electric machines can, on the one hand, be fed from a battery and used as an engine or drive, and, on the other hand, use as a generator or brake is also possible. This makes it possible to convert at least a portion of the kinetic energy of the vehicle during a braking operation into electrical energy and to store it in a battery.

The drag torque of the electric machine or machines which is/are operated as a generator and therefore the deceleration which can be achieved may be limited here for various reasons: the rotational speed dependency, described in a characteristic diagram, of the power of an electric machine, such as, in particular, the power drop at low rotational speeds, leads to a situation in which, for example at speeds below 10 km/h, it is no longer possible to build up any generator braking torque. The possible charge current of the battery can also limit the power which can be achieved. In particular, in the case of a relatively long journey through a pass it is possible that the battery is fully charged and regenerative braking is no longer possible. In addition, thermal overloading of the power electronics and/or battery has to be avoided.

As generally in the case of braking processes, a low coefficient of friction of the underlying surface makes brake slip control necessary. Depending on the configuration of the electric drives and, in particular, in the case of an electric drive which acts only on the rear axle, it may be necessary to limit the generator braking torque in order to ensure driving stability. Suitable braking force distribution is particularly required in the case of braking operations with high deceleration. The transmission ratio can also limit the achievable deceleration if the electric drive is connected to the wheels via a transmission.

In order to ensure sufficient deceleration in any situation, the vehicle wheels must therefore be additionally equipped with conventional friction brakes. For this reason, hybrid vehicles and electric vehicles generally use a regenerative brake system which splits the total braking torque during a normal braking process (without the intervention of driving stability controllers) into two portions: a generator braking torque, which is generated by the electric vehicle drive or drives and acts on the wheels via the drive train, and a friction braking torque, in the case of which the kinetic energy of the vehicle is converted into thermal energy as a result of friction of the brake linings at the brake disc. This portion of the kinetic energy which is converted into heat is therefore "lost" via friction during the braking process and limits the efficiency of the recuperation, for which reason a maximum portion of generator braking torque is aimed at in order to maximize the energy recover during a braking process and therefore reduce the consumption of primary energy by the vehicle. An exemplary regenerative brake system and a corresponding actuation method are described in DE 102011003346 A1, which is incorporated by reference.

Friction brake systems have a large number of electronic control devices which increase the driving safety by means of driving stability controllers. An exemplary system for controlling driving stability is known from EP 0792228 B1, which is incorporated by reference.

If a brake slip controller (also known as an ABS, i.e. anti-lock brake system) has to intervene during a full braking operation or a braking to a low coefficient of friction, in order to avoid locking of a wheel, said brake slip controller generally acts only on the portion of the braking torque which is generated by friction brakes. This is due to the fact, inter alia, that the change in a braking torque which is requested via a vehicle data bus (for example CAN bus) is implemented with a time constant which exceeds a typical slip control cycle. As a result, during an ABS control process a generator braking torque is usually not produced with respect to the driving stability or the maintenance of a suitable braking force distribution.

WO 2011/015422 A1, which is incorporated by reference, discloses a method for controlling a wheel brake slip for a vehicle having an electric drive, in which a brake signal is detected by means of a slip control device which generates an electric drive signal and a friction brake signal in order to control a predetermined slip value. The electric drive signal is transmitted to an electric drive control device which correspondingly activates the electric drive in order to generate an electric drive torque, and the friction brake signal is transmitted to a friction brake control device which activates a friction brake of the wheel in accordance with the friction brake signal. Highly dynamic control of the electric drive torque is preferably carried out at least partially in the electric drive control device, wherein, in particular, an electric drive rotational speed is detected and evaluated. Since the slip control takes place at least partially in the control device of the electric drive, the implementation must be specially adapted to the current vehicle.

SUMMARY OF THE INVENTION

An aspect of the present invention makes available a brake system and a method for controlling a brake system which permits slip-controlled braking without ending the recuperation.

This is achieved by a brake system for a motor vehicle comprising friction brakes on the wheels of at least one axle, which friction brakes are actuated by a friction brake control device, at least one electric machine which is connected to at least one wheel and is actuated at least at times as a generator by an electric drive control device, means for detecting a deceleration request, in particular a sensor for detecting activation of a brake pedal, and a wheel slip control device, wherein the means for detecting a deceleration request is/are connected to the wheel slip control device which predefines setpoint braking torques ($M_{wheel,req}$) for each wheel in accordance with the deceleration request ($a_{decel,req}$), wherein the wheel slip control device is connected to a torque distribution device which is connected to the friction brake control device and the electric drive control device and predefines friction braking requests ($M_{fric,req}$) to the friction brake control device and generator braking requests ($M_{reg,req}$) to the electric drive control device and a method for controlling a brake system for a motor vehicle, which comprises friction brakes on the wheels of at least one axle and at least one electric machine which is connected to at least one wheel and can be operated as a generator, comprising the steps: determining a current driving state by a state observer, wherein the current driving state comprises at least a current braking torque and at least one of two variables of a current wheel speed and a current slip for each individual wheel, determining wheel-specific setpoint braking torques on the basis of a deceleration request taking into account the current driving state, splitting the setpoint braking torques for the individual wheels into friction braking requests and a generator braking request/requests, and activating the friction brakes according to the friction braking requests and operating the electric machine according to the generator braking request/requests.

A brake system for a motor vehicle is therefore made available which comprises friction brakes on the wheels of at least one axle, which friction brakes are actuated by a friction brake control device, at least one electric machine which is connected to at least one wheel and is actuated at least at times as a generator by an electric drive control device, means for detecting a deceleration request, in particular a sensor for detecting activation of a brake pedal, and a wheel slip control device. According to an aspect of the invention, the means for detecting a deceleration request is/are connected to the wheel slip control device which predefines setpoint braking torques for each wheel in accordance with the deceleration request, wherein the wheel slip control device is connected to a torque distribution device which is connected to the friction brake control device and the electric drive control device and predefines friction braking requests to the friction brake control device and generator braking requests to the electric drive control device. The term "connected" is to be understood as meaning a flow of signals or information, i.e. it may involve either a physical connection such as, for example, a wire as well as a software interface.

The wheel slip control device is therefore not activated until excessive wheel slip occurs but rather in all driving situations predefines the setpoint braking torques which are divided by the torque distribution device between the brake systems which are present. This makes it possible to at least partially maintain a regenerative braking torque even in the case of a slip-controlled braking process. The recovery of energy is therefore maximized, wherein at the same time the stability of the vehicle is ensured. This means increased comfort for the driver since no fluctuations occur in the deceleration, which are caused, inter alia, by the deactivation of a generator.

In addition, the module structure according to the invention has the advantage that in the event of a change in the brake system the slip control device can be kept unchanged, while only the torque distribution device has to be adapted. This reduces the requirements in terms of manufacture and adaptation in the case of series produced vehicles. Furthermore, the global consideration of all the torques at the wheel makes it possible to dispense with an engine torque controller.

The wheel slip control device is expediently connected to a state observer which is connected to sensors for detecting at least the wheel speeds of each individual wheel, the yaw rate and the lateral acceleration, wherein at least the braking torques which are instantaneously present at the individual wheels are determined and are taken into account, alongside the wheel speeds or the wheel slip of the respective wheel, when predefining the setpoint braking torques. Further vehicle movement dynamics variables such as an estimated coefficient of friction can be fed to the wheel slip control device and taken account when predefining the setpoint braking torques. Since the driving state is taken into account when predefining the setpoint braking torques it is possible, for example, to adapt a braking force distribution between the front axle and rear axle before excessive slip occurs, for example at a rear wheel which is braked by a generator. Controller conflicts between a hybrid manager or an electric drive controller, which maximizes the recuperation, and the wheel slip control are avoided.

It is particularly expedient if the brake system also has a yawing moment control device which is connected to the state observer and a steering angle sensor and which compares the setpoint yaw rate, determined at least on the basis of the steering angle, and a measured yaw rate, wherein in accordance with the comparison result wheel-specific setpoint braking torques are determined and fed to the wheel slip control device. As a result, energy recovery can take place even during a vehicle movement dynamics control process such as an ESC. Furthermore, the structure of the brake system (or of the control device) can be serviced easily and satisfactorily since the multiple implementation of essentially identical functionalities is avoided.

The torque distribution device is preferably connected to the means for detecting the deceleration request, wherein the splitting between the friction braking requests and generator braking requests is carried out taking into account the current deceleration request and/or the current locking braking torque of the respective wheel and/or the velocity and/or the steering wheel angle and/or the lateral acceleration. If, for example, a critical driving situation is to be expected, the torque distribution can select the optimal splitting for the predefined drive configuration.

It is advantageous if the engine control device transmits the currently applied generator braking torque or torques and/or the maximum generator braking torque or torques which can be generated to the torque distribution device, and the splitting between the friction braking requests and the generator braking request or requests is carried out taking into account the generator braking torque or torques which is/are currently applied and/or the maximum generator braking torque or torques which can be generated. As a result, the regeneration capacity which is present, i.e. the possible recovery by the generator, can be utilized in the best possible way.

According to one preferred embodiment of the invention, the means for detecting a deceleration request also comprise an interface with a vehicle data bus via which an electronic control device, which is connected, in particular, to one or more surroundings sensors, transmits a deceleration request. The inventive structure of the wheel slip controller is transparent to external requests and makes available a clearly defined interface via which, for example, emergency braking assistant, which detects an obstacle on the basis of a surroundings sensor system, can request full braking.

The friction brake control device, the wheel slip control device and the torque distribution device are expediently integrated into an electronic control device and are preferably implemented entirely or partially as program code which is executed by a computing unit of the electronic control device. It is appropriate to carry out the wheel slip control by means of an electronic control device of a friction brake system which actuates hydraulic wheel brakes and/or electromechanical wheel brakes which are based on friction.

An aspect of the invention also relates to a method for controlling a brake system for a motor vehicle which comprises friction brakes on the wheels of at least one axle and at least one electric machine which is connected to at least one wheel and can be operated as a generator.

The method according to the invention comprises the steps:
determining the current driving state by means of a state observer, wherein the current driving state comprises at least the current braking torque and at least one of the two variables of the current wheel speed and current slip for each individual wheel,
determining wheel-specific setpoint braking torques on the basis of a deceleration request taking into account the current driving state,
splitting the setpoint braking torques for the individual wheels into friction braking requests and a generator braking request/requests, and
activating the friction brakes according to the friction braking requests and operating the electric machine according to the generator braking request/requests.

Since the driving state is already taken into account when predefining the setpoint braking torques, the occurrence of excessive wheel slip can already be avoided in advance in many cases. Maintaining generator braking even during slip control increases the efficiency of the recuperation.

It is advantageous if the generator braking request is determined in accordance with the current braking torque, wherein for a wheel which is connected to a generator the friction braking request is determined on the basis of a comparison of the setpoint braking torque with the generator braking request. A consistent braking behavior of the vehicle is therefore ensured.

If a first electric machine is connected to at least two wheels, it is particularly advantageous to select the generator braking request to the first electric machine as a predefined portion of the minimum current braking torque of the coupled wheels.

If at least one wheel is assigned an electric machine which is connected to no other wheel, the generator braking request to the assigned machine is expediently determined on the basis of a characteristic curve $K(\mu)$ which is dependent on the estimated coefficient of friction $\mu$, preferably according to the relationship $K(\mu) \cdot C \cdot M_{wheel}$ wheel with a constant $C$ and the current braking torque $M_{wheel}$ at the wheel under consideration. By means of the characteristic curve, which is determined beforehand, for example in driving trials, optimum distribution with low computing expenditure during driving can be implemented by means of a control device.

BRIEF DESCRIPTION OF THE DRAWINGS

Further preferred embodiments can be found in the dependent claims and the following description of an exemplary embodiment with reference to figures.

In the drawings:
FIG. 2(a) shows an exemplary braking of a vehicle with brake slip control according to the prior art,
and
FIG. 2(b) shows an exemplary braking of a vehicle with continued recuperation during brake slip control.

DETAILED DESCRIPTION OF THE INVENTION

Figure 1:
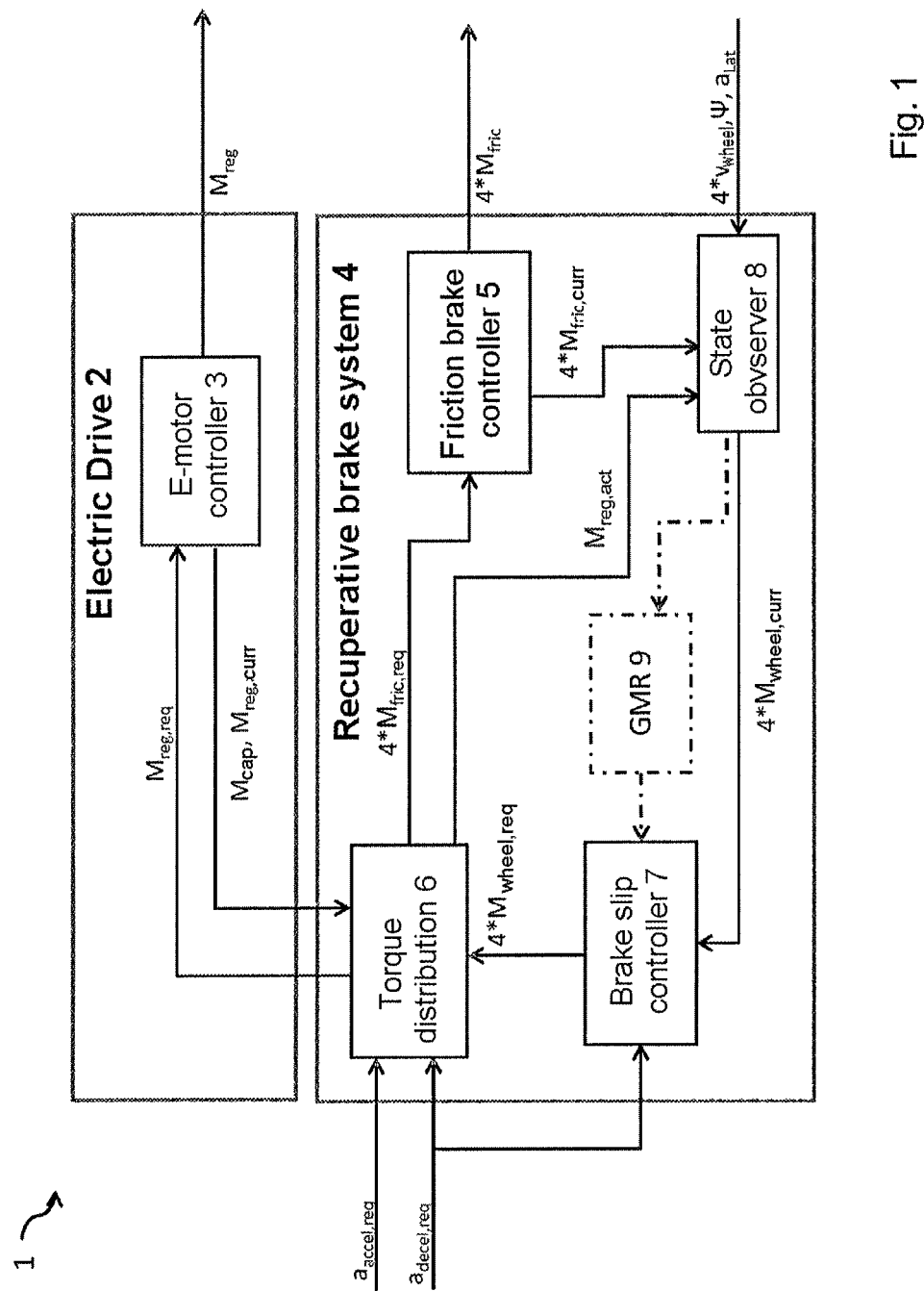
FIG. 1 shows a schematically illustrated exemplary embodiment of the brake system according to the invention.

The exemplary embodiment illustrated in FIG. 1 shows the partial systems for regenerative braking with slip control and the exchange of information between the partial systems. Rectangles indicate individual systems or function units here, while connections between the systems are represented by arrows which also indicate the direction of the flow of signals or information and specify the corresponding variable by means of designators.

A regenerative brake system 1 therefore comprises the following partial systems:
An electric drive 2, which is actuated by an E-motor controller or an electric drive controller 3 in order to apply a generator braking torque $M_{reg}$ or, in the case of a desired acceleration, a drive torque at one or more wheels, and
a recuperative brake system 4 which friction brakes and a friction brake controller or a friction brake control device 5, and a torque distribution or torque distribution device 6 (also referred to as a torque splitter) which permits "blending" and preferably infinitely variable blending between regenerative braking and pure friction braking, and also a brake slip controller or a brake slip control device 7 which controls the setpoint braking torques of the individual wheels and prevents the occurrence of excessive brake slip.

In the case of a braking process, the total braking torque $M_{brake}$ which is requested by the driver or the deceleration request $a_{decel,req}$ is determined from the activation of the brake pedal by, for example, a sensor measuring the activation travel, the pedal angle or the pedal force exerted by the driver. The deceleration request is used as an input signal for the regenerative braking, i.e. a means for detecting a deceleration request, in particular a sensor for detecting activation of the brake by the driver, such as, for example, a pedal angle sensor or travel sensor at the master brake cylinder, is connected to the brake slip controller 7. The brake slip controller 7 determines setpoint braking torques $M_{wheel,req}$ for the individual wheels from the deceleration request. While in the case of weak braking at a high coefficient of friction the deceleration request can be implemented by the vehicle, for example, in accordance with a predefined braking force distribution, in the case of a strong braking process (for example full braking with deceleration of 1 g which corresponds to the acceleration due to gravity) or in the case of a low coefficient of friction of the underlying surface, it may be necessary to regulate the braking torques of the individual wheels in order to prevent locking of the wheels.

In order to detect a corresponding control requirement, the braking slip controller 7 requires numerous information items regarding the vehicle movement dynamics state of the vehicle such as, for example, the velocity, current longitudinal acceleration and/or lateral acceleration, steering wheel angle, yaw rate, stability index, locking torques of the individual wheels and the coefficient of friction of the underlying surface (if appropriate also at the individual wheels). The wheel slip control device 7 is therefore connected to a state observer 8 which receives signals from a plurality of sensors and calculates at least the current wheel braking torques $M_{wheel,curr}$ therefrom. At the wheels which are connected to an electric drive, the wheel braking torque is therefore respectively composed of a current generator braking torque $M_{reg,curr}$ and a current friction braking torque $M_{fric,curr}$. The state observer 8 is expediently connected at least to a wheel speed sensor for each wheel which indicates the current wheel speed $v_{wheel}$, to a sensor for measuring the yaw rate $\dot{\Psi}$ and a sensor for measuring the lateral acceleration $a_{lat}$. This information can be used to determine what braking torque each wheel can at least assume without putting the stability of the wheel or of the vehicle in danger. At the same time, it is therefore possible to prevent, during a brake slip control process, a smaller setpoint braking torque being requested than this braking torque which can be implemented.

According to one preferred embodiment of the invention, the state observer is also used for vehicle movement dynamics control 9, in particular a yawing moment control GMR. In addition, further vehicle control systems such as rollover prevention (also known as active rollover protection or ARP) or driver assistance systems can determine predefined values for braking torques. The various setpoint braking torques are then expediently fed to an arbitration device which decides, on the basis of predefined rules, which braking torque predefined value is transmitted to the wheel slip controller and therefore implemented by said controller.

The setpoint braking torques $M_{wheel,req}$ which are determined by the brake slip controller 7 are passed onto the torque distribution system 6, also referred to as a torque splitter, which determines therefrom generator braking torque requests $M_{reg,req}$ and friction braking requests $M_{fric,req}$ taking into account the drive train concept, that is to say distributes the total braking torque correspondingly to the electric drive 2 and the friction brakes.

The electric drive 2 has at least one electric machine which applies a generator braking torque or a driving torque in accordance with the E-motor controller 3. The electric machine can be a central motor which acts equally on all the wheels of one axle or of the entire vehicle or wheel-specific electric motors, in particular wheel hub motors. A generator braking torque can therefore be generated at the driven wheels which are connected to an electric machine, in order to absorb the kinetic energy of the vehicle and convert it into electric energy. The E-motor controller 3 can also estimate the maximum possible generator braking torques, that is to say what is referred to as the regeneration capacity $M_{cap}$, on the basis of the properties of the electric machine or machines and the battery (in particular the filling state of charge S.O.C. of the battery). The currently converted generator braking torques $M_{reg,curr}$ and the regeneration, capacity $M_{cap}$ is continuously passed on from the E-motor controller 3 to the recuperative brake system 4 and taken into account by the torque distribution system 6.

In the text which follows, the torque distribution between the friction brake and the generator which is performed by the torque splitter will be explained in more detail. The generator braking request $M_{reg}$ and therefore also the distribution are dependent on the drive concept.

If two or more wheels are connected to a single electric drive, the generator braking request per wheel ($M_{reg,i}$) can be derived from the current wheel braking torques $M_{wheel,i}$, with the result that the minimum wheel braking torque of all the coupled wheels is requested multiplied by a factor K of, for example, 0.5 to 0.8, as the generator braking torque.

If the generator braking torque can be set on the wheel-specific basis (for example in the case of wheel hub motors), a generator braking request of $K*C*M_{wheel}$ is expedient, with $K=Fkt(\mu)$, where $\mu$ takes into account the coefficient of friction between the wheel and the road and C is a constant.

In principle, various strategies can be adopted for splitting the setpoint braking torque into a generator braking request and a friction braking request (which are then converted into corresponding torques by activated actuators). With respect to also being able to consider an acceleration request $a_{accel,req}$ in a unified fashion, it is advantageous to balance the total torque at the respective wheel $M_{wheel}$ and at the vehicle $M_{total}$ as a sum of the individual wheel torques. In this context it may be expedient to determine a generator setpoint braking torque $M_{gen}$ as an intermediate variable and then to distribute it to the individual generators taking into account the drive train configuration. In this context, the torque distribution device simultaneously considers the regeneration capacity $M_{cap}$ as a sum of possible generator breaking torques and the calculated generator setpoint braking torque $M_{gen}$ in order to make these requests to the drive train $M_{reg,req}$ and to the friction brake system $M_{fric,req}$. In this context, the following relationships apply:

$$M_{total}=M_{reg,req}+M_{fric,req}$$

$$M_{limit}=\min(M_{cap},M_{gen})$$

$$M_{reg,req} \leq M_{limit}$$

The request to deceleration or the corresponding total braking torque is the sum of the generator braking request and the friction braking request. If the generator setpoint braking torque (which has been determined, for example, on the basis of the currently present total torque) exceeds the maximum regeneration capacity, the generator setpoint braking torque is correspondingly limited. If this appears appropriate, for example, with respect to a critical driving situation to be expected (for example in order to achieve an optimum braking force distribution), the generator braking request can be reduced further in comparison with the limited generator setpoint braking torque $M_{limit}$.

If the vehicle has a wheel-local E-motor concept or a drive train with an individual motor (in particular wheel hub motor) on each driven wheel, it is expedient to consider each driven wheel individually. Each driven wheel is then assigned a generator setpoint braking torque $M_{gen,i}$. The total generator setpoint braking torque $M_{gen}$ can be composed of the individual wheel generator setpoint braking torques $M_{gen,i}$:

$$M_{Gen}=\Sigma M_{Gen,i}$$

If the vehicle has only one drive axle or if each drive axle has a common electric motor for both wheels, the rain setpoint braking torque $M_{gen,A}$ of the drive axle under consideration is expediently determined by the driven wheel with the relatively small rain setpoint braking torque $M_{gen,i}$ as follows (here, l and r indicate the left-hand and right-hand wheels, respectively):

$$M_{gen,A}=2\cdot\min(M_{gen,l},M_{gen,r})$$

For vehicles with four-wheel drive and with a central electric motor, the rain setpoint braking torques $M_{gen,A}$ must firstly be calculated for the front axle (denoted by the index FA) and rear axle (index RA) separately as above.

If the central drive has a variable torque distribution between the front axle and the rear axle, the total generator setpoint braking torque $M_{gen}$ is the sum of the two generator setpoint braking torques at the two axles:

$$M_{gen}=M_{gen,FA}+M_{gen,RA}$$

If the central drive has a fixed torque distribution k between the front axle and the rear axle, the following relationship between the total generator setpoint braking torque $M_{gen}$ and the two generator setpoint braking torques of the two axles applies:

$$M_{gen}=\min(M_{gen,FA},M_{gen,RA}/k)+\min(k\cdot M_{gen,FA},M_{gen,RA})$$

As a result, in a wheel-local concept, generator setpoint braking torques are used directly for determining the generator braking requests, whereas in concepts with a central electric motor which is respectively assigned to one axle or to all the wheels, axle-minimal arbitration of the generator braking torques of the individual wheels has to be carried out for the front axle and/or rear axle.

As a result of the fact that the drive configuration does not have to be taken into account until the torque distribution, there is a transparent interface with the brake slip control or further driving stability or driver assistance functions which require deceleration of the vehicle or wheel-specific braking torques. Changes to the drive configuration act only on the torque distribution device and not on superordinate functions.

FIG. 2 illustrates the time profile of an exemplary braking operation with brake slip control, wherein FIG. 2(a), i.e. the left-hand column, shows braking according to the prior art, while FIG. 2(b), i.e. the right-hand column, shows braking according to the method according to an aspect of the invention or with a brake system according to an aspect of the invention. The top line shows the wheel speed $v_{wheel}$, while the state of charge S.O.C. of the battery is represented on the second line. The third or fourth line show the friction braking torque $M_{fric}$ or the generator braking torque $M_{reg}$.

At the start of the preceding acceleration phase, the state of charge (S.O.C.) of the battery was 50%. If the recuperation is, as illustrated in line 101, aborted at the time $t_0$ or at the entry into the ABS control process, the portion of the fed-back energy is, at approximately 15% of the consumed energy, small. The slow depression of the brake, shown here, has a recuperation phase of 1.5 seconds in this case. If the recuperation is maintained during the brake slip control with a controlled generator setpoint braking torque, as shown on line 102, the portion of the recuperated energy increases to approximately 34% of the energy consumed in the acceleration process.

In addition to increased energy recovery, this has the advantage that the brake pressure at the drive axle during the brake slip control with recuperation is lower, by a half, than the case without recuperation. The pressure modulation of the friction brake has visibly smaller amplitudes if generator braking torques are calculated by the recuperative brake system, i.e. the electric drive also carries out part of the control task. In addition to a gain in comfort owing to fewer pedal reactions and less activity of the hydraulic pump, this also has the advantage that the slip amplitudes also become smaller or the wheel speeds deviate less from the desired behavior.

The advantage of a brake slip control process including the electric drive can be optimized with wheel hub motors in the control concept. Specifically if the wheel hub motor can be controlled quickly, this strategy can provide improved ABS control. Given high slip run-ins (depression of the pedal at a low p, i.e. low coefficient of friction), the E-motor can bring the wheel more quickly into an optimum deceleration slip range through active driving similarly to a motor drag torque control than the friction brake. In this context, the vehicle reference speed which is calculated by the ABS has to take into account the engine control signals in a suitable way in order to avoid detecting a false stability phase of the wheel, because the reference calculation interprets slowing of the reverse speed of the wheel as an approximation to the vehicle speed.

With the brake system according to the invention and the method according to the invention it is therefore possible to ensure that a brake slip control process can take place even in an at least partially electrically driven vehicle without the recuperation having to be completely ended. In addition to improved energy efficiency, this also leads to increased comfort for the driver since the ending of the recuperation is frequently felt to be an uncomfortable acceleration during a braking process. The unified consideration of the total wheel torque in all the driving situations simplifies the overall concept. If the calculation of the setpoint braking torque also occurs when there is no control by the brake slip controller, hydraulic interventions, which have a comfort-reducing effect owing to the pedal reaction and the noise of the pump, can frequently be avoided by adapted distribution between the generator and the friction brake.

The invention claimed is:

1. A brake system for a motor vehicle comprising:
   friction brakes on wheels of at least one axle of the motor vehicle, which friction brakes are actuated by a friction brake control device;
   at least one electric machine which is connected to at least one wheel and is actuated at least at times as a generator by an electric drive control device;
   a sensor for detecting activation of a brake pedal of the motor vehicle;
   a torque distribution device; and
   a wheel slip control device,
   wherein the sensor is connected to the wheel slip control device and the wheel slip control device calculates braking torque values ($M_{wheel,req}$) for each wheel in accordance with a deceleration request ($a_{decel,req}$) embodied by the activation of the brake pedal,
   wherein the wheel slip control device is connected to the torque distribution device and the torque distribution device is connected to the friction brake control device and the electric drive control device, and
   wherein the torque distribution device calculates friction braking requests ($M_{fric,req}$) to the friction brake control device and generator braking requests ($M_{reg,req}$) to the electric drive control device based on the braking torque values calculated by the wheel slip control device, the generator braking requests being calculated based on a current braking torque on at least one of the wheels, and the friction braking requests being calculated based on the braking torque values calculated by the wheel slip control device and the generator braking requests calculated by the torque distribution device.

2. The brake system as claimed in claim 1, wherein the wheel slip control device is connected to a state observer which is connected to sensors for sensing at least the wheel speeds ($V_{wheel}$) each individual wheel, the yaw rate ($\dot{\Psi}$) and of the lateral acceleration ($a_{lat}$), wherein at least the instantaneously present braking torques ($M_{wheel,inst}$) at the individual wheels are determined and taken into account in the calculation of the braking torque values ($M_{wheel,req}$).

3. The brake system as claimed in claim 2, further comprising a yawing moment control device which is connected to the state observer and to a steering angle sensor and which compares the setpoint yaw rate, determined at least on the basis of the steering angle, and a measured yaw rate, wherein wheel-specific braking torque values ($M_{wheel,req}$) are determined in accordance with the comparison result and fed to the wheel slip control device.

4. The brake system as claimed in claim 1, wherein the torque distribution device is connected to the sensor and the splitting between the friction brake requests ($M_{fric,req}$) and the generator braking requests ($M_{reg,req}$) is carried out further taking into account at least one of the current deceleration request ($a_{decel,req}$) and/or the velocity and/or the steering wheel angle and/or the lateral acceleration ($a_{lat}$).

5. The brake system as claimed in claim 1, wherein the electric drive control device transmits the currently applied generator braking torque or torques ($M_{reg,curr}$) and/or the maximum generator braking torque or torques ($M_{cap}$) which can be generated to the torque distribution device, and the splitting between the friction braking requests and the generator braking request or requests is carried out taking into account the generator braking torque or torques which is/are currently applied and/or the maximum generator torque or torques which can be generated.

6. The brake system as claimed in claim 1, further comprising an interface with a vehicle data bus via which an electronic control device, which is connected, in particular, to one or more surroundings sensors, transmits a deceleration request.

7. The brake system as claimed in claim 1, wherein the friction brake control device, the wheel slip control device and the torque distribution device are integrated into an electronic control device and are preferably implemented entirely or partially as program code which is executed by a computing unit of the electronic control device.

8. A method for controlling a brake system for a motor vehicle, the motor vehicle comprising:
   friction brakes on wheels of at least one axle of the motor vehicle, which friction brakes are actuated by a friction brake control device; and
   at least one electric machine which is connected to at least one wheel and can be operated as a generator;
   a sensor for detecting activation of a brake pedal of the motor vehicle, a torque distribution device; and
   a wheel slip control device,
   wherein the sensor is connected to the wheel slip control device and the wheel slip control device calculates braking torque values ($M_{wheel,req}$) for each wheel in accordance with a deceleration request ($a_{decel,req}$) embodied by the activation of the brake pedal,
   wherein the wheel slip control device is connected to the torque distribution device and the torque distribution device is connected to the friction brake control device and the electric drive control device, and
   wherein the torque distribution device predefines calculates friction braking requests ($M_{fric,req}$) to the friction brake control device and generator braking requests ($M_{reg,req}$) to the electric drive control device based on the braking torque values calculated by the wheel slip control device, the generator braking requests being calculated based on a current braking torque on at least one of the wheels, and the friction braking requests being calculated based on the braking torque values calculated by the wheel slip control device and the generator braking requests calculated by the torque distribution device,
   wherein the method comprises:
   determining a current driving state by a state observer, wherein the current driving state comprises at least the current braking torque on the at least one of the wheels and at least one of two variables of a current wheel speed and a current slip for each individual wheel,
   determining wheel-specific braking torque values on the basis of the deceleration request taking into account the current driving state,
   splitting the braking torque values for the individual wheels into friction braking requests and a generator braking request/requests, and
   activating the friction brakes according to the friction braking requests and operating the electric machine according to the generator braking request/requests.

9. The method as claimed in claim 8, wherein the generator braking request is determined in accordance with the current braking torque, wherein for a wheel which is connected to a generator the friction braking request is determined on the basis of a comparison of the braking torque values with the generator braking request.

10. The method as claimed in claim 9, wherein at least one wheel is assigned an electric machine which is connected to no other wheel, and the generator braking request to the assigned machine is determined on the basis of a characteristic curve $K(\mu)$ which is dependent on the estimated coefficient of friction $\mu$ between the wheel under consideration and a road according to the relationship $K(\mu) \cdot C \cdot M_{wheel}$ with a constant C and the current braking torque $M_{wheel}$ at the wheel under consideration.

* * * * *